Feb. 20, 1973 D. HARTMANN 3,717,230

FRICTION CLUTCH PLATE

Filed May 28, 1970 2 Sheets-Sheet 1

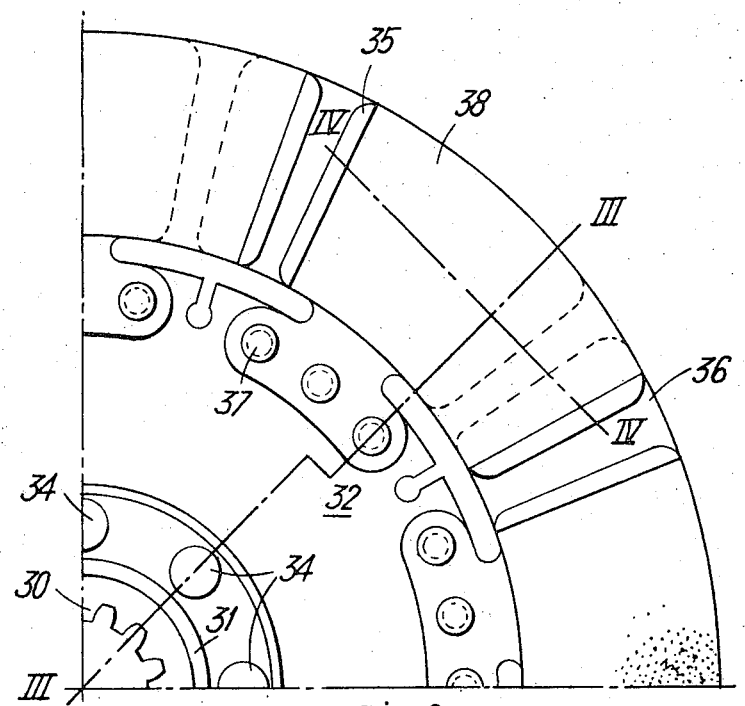
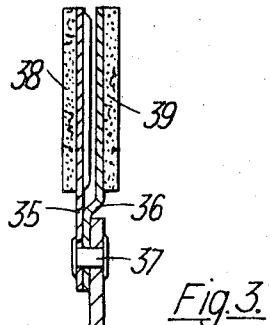
Fig.3.
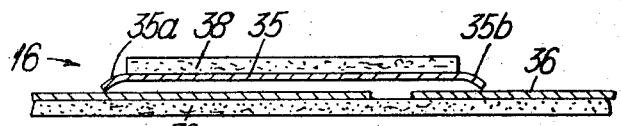
Fig.4.
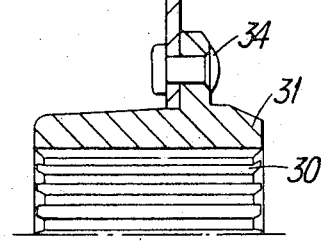
Fig.5.

United States Patent Office 3,717,230
Patented Feb. 20, 1973

3,717,230
FRICTION CLUTCH PLATE
Dieter Hartmann, Langenhain, Germany, assignor to General Motors Corporation, Detroit, Mich.
Filed May 28, 1970, Ser. No. 41,394
Claims priority, application Germany, May 31, 1969, P 19 27 872.9
Int. Cl. F16d 13/60
U.S. Cl. 192—107 R      9 Claims

ABSTRACT OF THE DISCLOSURE

A friction clutch plate having two sets of axially-resilient metal segments, carrying friction material, one set on the side facing the flywheel and the other set on the side facing the thrust plate. The sets are circumferentially staggered one to the other, and, in one set, each of the metal segments includes a flat portion having the friction material secured to it by adhesive, and a resilient portion formed by radial edges on the flat portion which are bent-over towards the second set of segments. The segments of the second set also have friction material secured to them.

---

Figure 1:
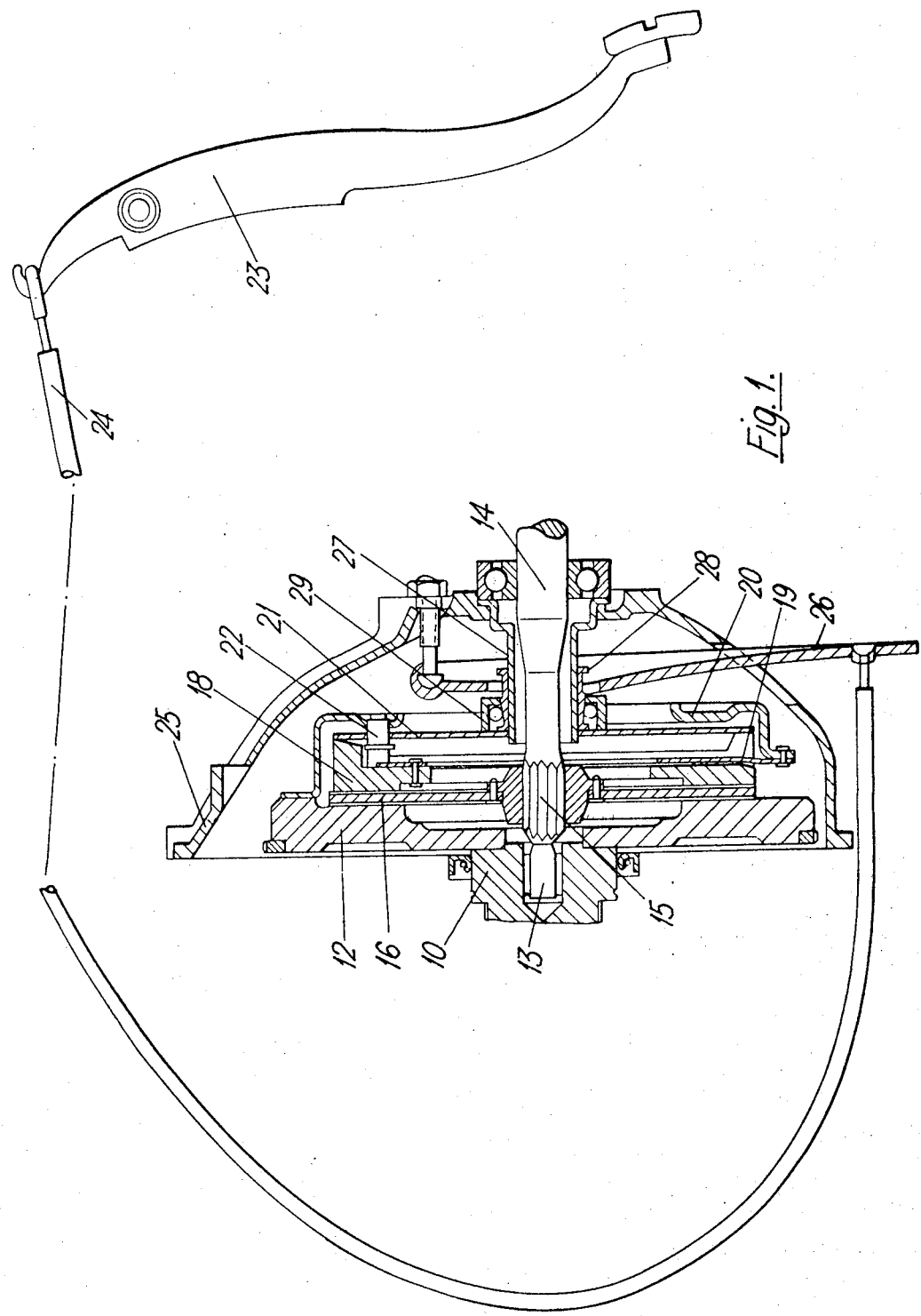

The invention relates to clutch plates for friction clutches, particularly for motor vehicles, and having individual, axially-resilient segments which support friction material.

In the clutch plates of this kind usual heretofore, the segments are so formed that they are bent towards one side, or towards both sides in order to impart a certain flexibility during engagement of the clutch and therefore to attain gentle clutching-in. Here the friction lining segments are riveted on to the resilient segments. Riveting makes it necessary to dimension the friction lining in greater thickness than would be necessary for wear alone. Such dimensioning of the linings and their riveting make the clutch plates fairly heavy and therefore render gear-changing difficult.

The invention aims at obviating the above defects and providing a clutch plate which has smaller dimensions and therefore makes gear-changing easier. In addition, the new clutch plate has a longer useful life, assuming identical thickness of lining, since the friction lining can be completely used up, except for a small remainder. As it is possible to dispense with riveting on of the fritcion material, the clutch plate has a lower mass which contributes considerably not only towards facilitating gear-changing, but also towards advantageously influencing the troublesome vibration effect (German:Rupfen) experience during clutch engagement, because with clutch plates according to the invention the frequencies are de-tuned. These and other advantages and improvements are attained, in the main due to the fact that the friction lining is stuck on to, or cemented on to, the resilient segments of the clutch plate.

Admittedly, an attempt has already been made to stick or cement friction linings on to the discs of plate clutches. Heretofore however, this was only possible in the case of perfectly flat clutch plates (German patent specification 1,226,835). In the case of clutch plates with axially-resilient segments in order to attain axial flexibility, adhesive application was not possible because the plane friction elements only have a line contact with the segments thus deformed and, if the segments do deform under pressure, a relative movement between the elastic elements and the friction lining occurs.

The present invention solves the resulting problem by proposing that the elastic segments should consist of a flat portion carrying the friction lining, and of a resilient portion. The friction linings are stuck on or cemented on to the flat portion whilst the resilient portion is formed by bent-over end parts and/or tongues pressed out of the flat portion of the segments. Thus, during clutch engagement the resilient portion flexes or bends as the thrust plate moves towards the flywheel to engage the driven plate but the flat portion with the friction material cemented thereon is less resilient and remains flat to substantially uniformly load the friction material without bending in the cemented area. According to a preferred embodiment, the resilient segments in section, have the shape of an elongated U on whose drawn-out flat base, the friction lining is mounted by sticking on or cementing on. The segments thus formed may be arranged towards each other in various ways, as required.

Embodiments of the invention are described below with reference to the accompanying drawing in which:

FIG. 1 is a schematic presentation of a vehicle clutch;
FIG. 2 is an axial view of a portion of a clutch plate according to the invention;
FIG. 3 is a section along line III—III of FIG. 2;
FIG. 4 is a section along line IV—IV of FIG. 2; and
FIG. 5 is a section similar to FIG. 4 but showing another embodiment of the invention in which both sides of the clutch plate are provided with lining segments.

In the motor vehicle clutch ilustrated in FIG. 1, reference numeral 10 denotes the engine output shaft which carries the flywheel 12 in rotatively fast manner. The clutch shaft 14 is mounted in the engine output shaft by means of an extension 13 of reduced diameter. At its front end, the clutch shaft 14 is provided with splines 15 by means of which the clutch plate 16 is connected with the shaft 14, rotatively rigid but longitudinally displaceable. A clutch thrust-plate 18 is connected through flexible tongues 19 to the clutch cover 20 which in turn is secured to flywheel 12. Between the clutch cover 20 and the clutch thrust-plate 18 there is a disc spring 21 which, when the clutch is operative, presses the axially displaceable clutch thrust-plate 18 against the clutch plate 16, and this latter against the flywheel 12. In this way, the frictional connection between the engine output shaft 10 and the clutch shaft 14 is established. The coned spring 21 is tiltably mounted on pin 22 secured to the clutch cover 20.

During declutching, depression of the clutch pedal 23 acting through a Bowden wire operates a shift lever 26 which is mounted in the clutch housing 25. Through this lever, a shift sleeve 28 arranged on a guide bush 27, is pushed forward against the inner edge of the disc spring 21, the shift pressure being transmitted via a thrust bearing 29 on to the disc spring 21. Due to the resultant deformation of disc spring 21, the application pressure between flywheel 12, clutch plate 16 and clutch thrust-plate 18 is annulled, and the clutch is disengaged.

It is well known, that during clutch-in, i.e. when pedal 23 is released, the clutch plate 16 is suddenly applied and gentle engagement can only be attained through a clutch plate having axial elasticity. Moreover, in the interests of gentle engagement and easier gear-change, a clutch plate with the lowest possible mass should be aimed at.

The resulting requirements are completely fulfilled by the invention and at the same time the tendency to a vibrational effect which is a feature of the known clutches, is eliminated to a high degree.

In FIGS. 2 to 5, the construction of a clutch plate 16 according to the invention is illustrated in detail. In FIGS. 2 and 3, reference numeral 30 denotes the spline profile of the clutch plate hub 31. The plate 32 is firmly secured to the hub by means of rivets 34. A plurality of resilient spring segments 35/36 are secured to disc 32 by means of rivets 37. According to the invention, the spring segments 35, which are those on the side towards the flywheel 12, are bent over at their radially disposed edges, towards the flat spring segments 36 arranged at the side towards the clutch thrust-plate 18. The spring segments 35 constructed in accordance with the invention, have the friction lining 38 stuck onto them, also in individual segments, whilst the oppositely disposed flat segments 36 carry a closed friction-lining ring 39.

FIG. 4 is a section in peripheral direction through these resilient spring segments 35, 36 carrying the friction lining 38, 39. In this section, the spring segment 35 turned towards the flywheel 12, has substantially the shape of an elongated U with a long flat base, so that the lining 38 is offered a sufficiently large flat face upon which this lining can be durably stuck or cemented, by using a suitable cement such as a synthetic rubber phenalic cement or bonding adhesive like the nitrile phenalic cement "Bostik 1777" made by United Shoe Machinery Corp., Middleton, Mass., U.S.A., and its division Bostik G.m.b.H, Taunns, Germany or the cementing process disclosed in the Antheil U.S. Pat. 2,631,961, issued Mar. 17, 1953. The lateral ends 35a, 35b of the spring segment 35 are bent slightly inwards in axial direction, so that the clutch plate is flexible in axial direction in the area of its contact with the flywheel 12. The result is that inaccuracies in axial direction between the flywheel 12 and the clutch plate 18, are compensated.

Departing somewhat from the embodiment according to FIG. 4, it is particularly advantageous if the friction lining is also divided into individual segments 40 at the side of the clutch plate 16 facing the thrust plate 18 (FIG. 5). By dividing up the usual closed ring clutch lining into individual segments, a more uniform stressing of the riveted joints is obtained, during the transmission of torque. Each segment directly transmits a portion of the delivered torque corresponding to the application pressure applied to it, which pressure can be differingly great over the periphery, owing to the axial stroke between thrust plate and flywheel. With the former arrangements, in the most unfavourable cases, the closed friction ring serves as a transmission member between the friction lining and the hub of the clutch plate, but as this is now dispensed with, the rotary vibration system is so de-tuned that the troublesome vibrational effect referred to above is avoided to a high degree.

It has been found appropriate to arrange the segments 35 and 36 carrying the friction lining 38, 39, 40 in such a way that they are staggered, so that one of the elements provided with the U-shaped bent-over arms, is arranged between two flat segments, as shown in FIGS. 2, 4, and 5.

What is claimed is:

1. Friction clutch plate comprising flat annular friction material members, axially resilient metal plate segments carrying a said flat friction material member, each of said segments including a large flat portion and a small resilient portion, said flat portions having one entire side flatly contacting and adhesively secured to substantially the entire area of said flat friction material member, the adhesively secured together flat portions and flat friction material member being substantially rigid, said resilient portion being formed by parts deformed out of said flat portions on the side opposite said flat friction material member; and plate means on said opposite side of said flat portion engaging said resilient portions during clutch engagement for flexing said resilient portions while said flat portion remains flat, to provide axial resilient movement of said friction material member to substantially uniformly load said friction material member without bending of said friction material member and flat portions in the area of adhesive securement.

2. Friction clutch plate according to claim 1, in which said deformed parts forming the resilient portion are constituted by bent-over edges of said flat portion.

3. Friction clutch plate according to claim 2, in which said bent-over edges are approximately radial of the clutch plate.

4. Friction clutch plate comprising a plate; a pair of flat annular friction material members; first axially-resilient metal segments mounted on said plate and carrying one of said flat friction material members at one side of the first segments and said plate; second axially-resilient metal segments mounted on said plate, having one side facing the other side of said first segments, carrying the other of said friction material members at the other side of said second segments and the plate and circumferentially staggered relative to the first segments; each of said first segments including a large flat portion and a small resilient portion; said flat portion having one side flatly and entirely contacting and adhesively secured to substantially the entire area of said one friction material member; the adhesively secured together flat portions and flat friction material member being substantially rigid; and said resilient portion being formed by parts deformed out of said flat portion in the direction away from said one friction material member on said first segments and said other side of said first segments and toward said one side of said second segments for flexing engagement with said second segments during clutch engagement to provide axial resilient movement of said first and second segments and the friction material members thereon to substantially uniformly load said friction material members without bending in the area of adhesive securement.

5. Friction clutch plate according to claim 4, in which said deformed parts are constituted by bent-over edges approximately radial of the clutch plate.

6. Friction clutch plate according to claim 4, in which the friction material carried by said second segments is secured thereto by adhesive.

7. A friction clutch including a flywheel, a thrust plate, and a clutch plate between said flywheel thrust plate; the clutch plate comprising a hub, a pair of series of flat annular friction material members, axially-resilient metal segments arranged in a pair of closely spaced annular series, mounted on said hub and each annular series of segments carrying one of said flat friction material members on the outer side, one facing the flywheel and one facing the thrust plate; each of said segments including a large flat portion, said flat portions of each series substantially continuously annularly flatly contacting and flatly and entirely secured by adhesive to substantially the entire area of one of said annular friction material members, the adhesively secured together flat portions and annular friction material members being substantially rigid, and resilient means being formed by parts deformed out from the inner side of said flat portion and away from said friction material member of one series of segments and contacting the other series of segments during clutch engagement for flexing said resilient means while said flat portions and annular friction material members remain flat to provide axial resilient movement of said friction material members to substantially uniformly load said friction material members without bending in the area of adhesive securement.

8. A friction clutch according to claim 7, in which the said clutch plate includes second, axially-resilient, metal segments which are located on the side towards the said thrust-plate and are staggered relative to said first segments.

9. A friction clutch according to claim 8, in which said second metal segments each carry a segment of friction material secured by adhesive.

References Cited
UNITED STATES PATENTS

| | | | |
|---|---|---|---|
| 1,945,382 | 1/1934 | Saks | 192—70.14 |
| 2,244,134 | 6/1941 | Thelander | 192—106.2 |
| 3,064,782 | 11/1962 | Du Bois | 192—107 R |
| 3,526,307 | 9/1970 | Falzone | 192—107 C P |

CHARLES J. MYHRE, Primary Examiner

R. HEALD, Assistant Examiner

U.S. Cl. X.R.

192—70.14, 106.2